United States Patent
Watson et al.

(10) Patent No.: US 6,261,987 B1
(45) Date of Patent: Jul. 17, 2001

(54) METHOD FOR PREPARING AN ALKYLATION CATALYST, AND FOR ORTHO-ALKYLATING HYDROXYAROMATIC COMPOUNDS; AND RELATED COMPOSITIONS

(75) Inventors: Beth A. Watson, East Greenbush; Narsi Devanathan, Slingerlands, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/515,466

(22) Filed: Feb. 29, 2000

(51) Int. Cl.[7] ..................................................... B01J 21/10
(52) U.S. Cl. ........................ 502/183; 528/445; 528/489; 528/110; 502/226
(58) Field of Search .................................... 528/489, 495, 528/110; 502/183, 226

(56) References Cited

U.S. PATENT DOCUMENTS

| | | |
|---|---|---|
| 3,446,856 | 5/1969 | Hamilton, Jr. . |
| 3,974,229 | 8/1976 | Van Sorge . |
| 4,041,085 | 8/1977 | Frabetti, Jr. . |
| 4,048,239 | 9/1977 | Smith . |
| 4,092,294 | 5/1978 | Bennett, Jr. et al. . |
| 4,201,880 | 5/1980 | Van Sorge . |
| 4,418,224 | 11/1983 | Bennett et al. . |
| 4,547,480 | 10/1985 | Bennett, Jr. et al. . |
| 4,554,266 | 11/1985 | Bennett et al. . |
| 4,554,267 | 11/1985 | Chambers et al. . |
| 4,900,708 | 2/1990 | Bennett et al. . |
| 4,933,509 | 6/1990 | Warner . |

Primary Examiner—Duc Truong

(57) ABSTRACT

A method for preparing a solid catalyst composition is described. A magnesium reagent which yields magnesium oxide upon calcination, and which includes reduced levels of chlorides and calcium, is dry-blended with at least one filler. Dry-blending is usually carried out in the absence of a promoter. A method for selectively alkylating at least one hydroxyaromatic compound by using the catalyst is also described. A typical product is 2,6-xylenol. Related processes for preparing polyphenylene ethers are described.

17 Claims, No Drawings

METHOD FOR PREPARING AN ALKYLATION CATALYST, AND FOR ORTHO-ALKYLATING HYDROXYAROMATIC COMPOUNDS; AND RELATED COMPOSITIONS

TECHNICAL FIELD

This invention relates generally to alkylation catalysts. More particularly, it is directed to improved methods for preparing such catalysts, and for using the catalysts in the ortho-alkylation of hydroxyaromatic compounds.

BACKGROUND OF THE INVENTION

Ortho-alkylated hydroxyaromatic compounds are useful for a variety of purposes. For example, ortho-cresol is a useful disinfectant and wood preservative. It is often prepared by the vapor-phase reaction of a phenol with methanol. In another alkylation reaction, ortho-cresol and phenol can both be converted into 2,6-xylenol. This xylenol monomer can be polymerized to form poly(2,6-dimethyl-1,4-phenylene)ether, which is the primary component in certain high-performance thermoplastic products.

The alkylated hydroxyaromatic compounds are usually prepared by the alkylation of the precursor hydroxyaromatic compound with a primary or secondary alcohol. The alkylation must be carried out in the presence of a suitable catalyst, such as a magnesium-based compound. U.S. Pat. Nos. 4,554,267; 4,201,880; and 3,446,856 describe the use of magnesium oxide for this purpose.

A great deal of attention has been paid to optimizing the performance of magnesium-based catalysts in an industrial setting. Usually, it is very important for the catalyst to have high activity, i.e., it must have as long an active life as possible. Moreover, the catalyst must have very good ortho-selectivity. Many of the ortho-alkylation catalysts used in the past produced a high proportion of para-alkylated products of marginal utility.

As an illustration, the alkylation of phenol with methanol in the presence of a magnesium oxide catalyst yields ortho-cresol (o-cresol) and 2,6-xylenol, which are desirable products. However, the alkylation reaction may also produce substantial amounts of para-substituted compounds, such as para-cresol (p-cresol); 2,4-xylenol, and mesitol (2,4,6-trimethylphenol). In some end use applications, these para-substituted compounds are much less useful than the corresponding compounds containing unsubstituted para positions. For example, polyphenylene ethers prepared from such compounds lack the desired properties obtained when the starting material is primarily 2,6-xylenol.

Selectivity and activity are related to the characteristics of the ortho-alkylation catalyst, and to the manner in which it is prepared. In the above-mentioned U.S. Pat. No. 4,554,267 (Chambers et al), a magnesium-based catalyst is prepared with a slurry process, using selected amounts of a copper salt as a promoter. In the process, the magnesium reagent and an aqueous solution of the copper salt are combined to form a magnesium-containing solid phase, which includes uniform, well-dispersed copper. The solid phase is dried, shaped, and calcined. The catalyst system is then used in the alkylation reaction of phenol and methanol. The reaction produces relatively high levels of the desirable 2,6-xylenol product. Moreover, the "selectivity" of the catalyst system, i.e., the ratio of 2,6-xylenol yield to the combined yield of 2,4-xylenol and mesitol, is also quite high, as is the overall yield of 2,6-xylenol.

It is clear that a catalyst composition like that described in the patent of Chambers et al is very useful and effective for alkylation reactions. Moreover, the slurry process used to prepare such a catalyst can be efficiently carried out in some situations. However, there are drawbacks associated with the slurry process in other situations—especially in a large—scale production setting. For example, the "liquid"-related steps, which involve pre-blending of a copper compound with a magnesium compound, usually require mixing and holding tanks, recirculation piping, and specialized drying systems. Storage of the dried magnesium oxide/copper product (sometimes referred to as a "matrix") may also be required, prior to blending and shaping steps. These operations and the related equipment represent a considerable investment in time and expense (e.g., energy costs), and may therefore lower productivity in a commercial venue. Furthermore, use of the slurry process can sometimes introduce metal and halogen-based contaminants into the catalyst, via the water supply.

It should therefore be apparent that improved methods for alkylating hydroxyaromatic compounds would be welcome in the art. The improvements may advantageously depend on the catalyst systems used in the alkylation reaction. Thus, enhanced techniques for preparing the catalyst would also be very desirable. Any new process related to alkylation or catalyst preparation should provide significant advantages in one or more of the following aspects: catalyst selectivity, catalyst activity, product yield, cost savings, and overall productivity. Moreover, use of the new processes should result in products (e.g., 2,6-xylenol) which possess substantially all of the desirable characteristics of products made by prior art methods.

SUMMARY OF THE INVENTION

In response to the needs of the prior art, an improved method for preparing a solid catalyst composition has been discovered. The method comprises dry-blending at least one filler with a magnesium reagent which yields magnesium oxide upon calcination, thereby forming a blended product. The level of chlorides in the magnesium reagent is less than about 250 ppm, and the level of calcium in the magnesium reagent is less than about 2500 ppm. In some preferred embodiments, the level of chlorides in the magnesium reagent is less than about 125 ppm, and the level of calcium in the magnesium reagent is less than about 1000 ppm.

The filler is usually polyphenylene ether, graphite, or a mixture thereof, and is present in an amount up to about 20% by weight. Dry-blending in this process is carried out in the absence of a promoter, e.g., a copper promoter. In preferred embodiments, the catalyst composition is vacuum-deaerated after dry-blending. Other processing steps are often undertaken, e.g., sieving, milling, compressing, and then forming the catalyst into a desired shape, such as a pellet. The shaped catalyst is usually calcined before use.

Another embodiment of the invention is directed to a method for selectively alkylating at least one hydroxyaromatic compound, to form a desired product, such as 2,6-xylenol. In this method, the solid catalyst is prepared as mentioned above, and calcined. A hydroxyaromatic compound such as phenol is then reacted with an alkyl alcohol such as methanol, in the presence of the catalyst, to form the alkylated product.

A process for preparing a polyphenylene ether resin constitutes another embodiment of this invention. In this process, the magnesium-based alkylation catalyst is prepared and calcined as set forth below, and is used to form a 2,6-alkyl-disubstituted phenolic compound. The 2,6-alkyl-disubstituted phenolic compound is then oxidatively coupled in the presence of a suitable polymerization catalyst, to form the polyphenylene ether resin. Resins prepared by this process can be blended with one or more other materials, such as alkenyl aromatic resins, elastomers, polyamides, and combinations thereof.

Still another embodiment of this invention is directed to a catalyst composition, comprising a magnesium reagent and at least one filler, wherein the level of chlorides in the magnesium reagent is less than about 250 ppm, and the level of calcium in the magnesium reagent is less than about 2500 ppm.

Other details regarding the various embodiments of this invention are provided below.

DETAILED DESCRIPTION OF THE INVENTION

As mentioned above, a magnesium reagent is the primary component of the catalyst composition. Any magnesium reagent which yields magnesium oxide can be used. The preferred reagents are magnesium oxide, magnesium hydroxide, magnesium carbonate, basic magnesium carbonate, and mixtures of any of the foregoing. The magnesium reagent is in the form of a powder. The average particle size for the powder is usually in the range of about 5 microns to about 50 microns.

There often appears to be a difference in reagent particle shape for the present invention, as compared to reagent particles of the prior art. For example, substantially all of the particles for the present invention are generally spherical, and have a relatively smooth "edge" or surface, when viewed microscopically. In contrast, many of the reagent particles of the prior art do not appear to be as spherical, and have a relatively jagged edge or surface, when viewed in the same manner.

Basic magnesium carbonate is especially preferred for many embodiments of this invention. As described in U.S. Pat. No. 4,554,267, which is incorporated herein by reference, basic magnesium carbonate is sometimes referred to as "magnesium carbonate hydroxide". It is identified in *The Merck Index*, Ninth Edition. It is also described in *The Condensed Chemical Dictionary*, Tenth Edition (1981), Van Nostrand Reinhold Company, page 633, which is incorporated herein by reference. Those skilled in the art understand that the exact formula for basic magnesium carbonate varies to some extent.

For this invention, it is important that the level of chlorides in the magnesium reagent be less than about 250 ppm, and preferably, less than about 125 ppm. In some especially preferred embodiments, the level of chlorides in the magnesium reagent is less than about 100 ppm. (As used herein, "chlorides" refers to chloride ions, which are often present in the form of a salt). The level of calcium in the magnesium reagent should be less than about 2500 ppm, and preferably, less than about 1000 ppm. In some especially preferred embodiments, the level of calcium is less than about 750 ppm. (These levels of impurities can alternatively be specified with respect to the magnesium oxide-form which results from calcination, as described below. The impurity threshold levels in the calcined oxide would be approximately twice those for a basic magnesium carbonate reagent, e.g., less than about 500 ppm chlorides and less than about 5000 ppm calcium, in the broadest embodiment).

The present inventors have discovered that this reduction in the levels of chlorides and calcium results in a catalyst with very high activity. Moreover, the catalyst also has very good selectivity, e.g., ortho-selectivity. In other words, its use minimizes the production of unwanted byproducts, as illustrated in the examples which follow.

The levels of chlorides and calcium in the magnesium reagent can be determined by common analytical methods. For example, calcium levels can be determined by a titration technique or by some form of spectroscopy, e.g., inductively coupled plasma atomic emissions spectroscopy. Chloride levels are usually determined by titration or by ion chromatography. Magnesium reagents of this type can be made available by commercial sources upon request.

As mentioned above, the magnesium reagent is dry-blended with at least one filler. The term "filler" is meant to encompass various lubricants, binders and fillers which are known in the art for incorporation into this type of catalyst. The total amount of filler present in the catalyst composition is usually up to about 20% by weight, based on the total weight of filler and magnesium reagent. In some preferred embodiments, the level of filler is up to about 10% by weight. Examples of fillers used in the catalyst composition are graphite and polyphenylene ether (PPE). The polyphenylene ether is usually used in an amount of up to about 10% by weight, based on total weight, while the graphite is usually employed in an amount of up to about 5% by weight.

As used in this disclosure, the term "dry blending" refers to the general technique in which the individual ingredients are initially mixed together in the dry state, without resorting to any "wet" techniques, such as suspension blending or precipitation. Dry blending methods and equipment are known in the art, and described, for example, in Kirk-Othmer's *Encyclopedia of Chemical Technology*, 4th Edition, and in the *Modern Plastics Encyclopedia*, Vol. 67, No. 11, 1990, McGraw-Hill, Inc. Any type of mechanical mixer or blender can be used, such as a ribbon blender. Those skilled in the art are familiar with the general parameters for dry-blending this type of material. The ingredients should be mixed until an intimate blend is obtained, with the fillers being well-dispersed. The blending time is typically in the range of about 10 minutes to about 2 hours, at a shaft speed of about 5 rpm to about 60 rpm.

As alluded to earlier, a key feature for some embodiments of the present invention is the elimination of a promoter. In prior art catalyst-preparation, the presence of the promoter was usually required, but often made the blending process more difficult. As an example, the presence of a copper promoter, while used at low levels (about 200–300 ppm), required careful pre-blending with the magnesium carbonate. A poor dispersion of the copper promoter would result in catalyst deficiency, e.g., poor activity and poor selectivity. The pre-blending step was typically carried out as a wet process, i.e., a slurry, which therefore required additional steps, such as drying. Thus, the elimination of a promoter obviates the slurry pre-blending step, and this is an important advantage in commercial production.

After dry-blending of the magnesium reagent and filler (or multiple fillers) is complete, the blended, solid catalyst composition is in the form of a powder. The powder usually has a bulk density in the range of about 0.1 g/cc to about 0.5 g/cc, and preferably, in the range of about 0.25 g/cc to about 0.5 g/cc. The powder then typically undergoes further processing, prior to being shaped into a desired form. Non-limiting examples of the additional processing steps include sieving (to obtain a more narrow particle distribution), milling, and compressing.

In some preferred embodiments, the catalyst composition is compacted after dry-blending. Compacting equipment is known in the art, and described, for example, in the Kirk Othmer reference noted above. Commercial compacting systems are available from various sources, such as Allis-Chalmers; Gerteis Macshinen, Jona, Switzerland; and Fitzpatrick Co., Elmhurst, Ill. The compactors usually function by feeding the powdered material through rollers.

One specific example of a suitable compactor unit is known as the "Chilsonator™". In such a system, the catalyst powder is first fed to compaction rolls by a rapidly-turning vertical feed screw. The feed screw forces the powder into a roll nip. The rolls compress the material into a continuous solid sheet.

In most embodiments of this invention, the catalyst composition is deaerated after dry-blending, and prior to additional processing. This step is especially important in those instances in which the composition must subsequently pass through compaction rollers. Deaeration further increases the bulk density of the material by forcibly removing entrained gas (primarily air) from within the powder. Deaeration systems are known in the art and available from various sources. Vacuum deaeration is one common technique. The vacuum can be applied at various points along the passage of the powder from the blending unit to other processing operations. Usually, the vacuum is applied at a point very close to (and preceding) the location of compaction rollers. The strength of the vacuum will depend on various factors, such as the amount of powder being processed; its compressibility; the type of fillers contained therein, and the density of the powder. Usually, the vacuum strength is in the range of about 5 inches (12.7 cm) mercury to about 25 inches (63.5 cm) mercury.

The solid sheets of catalyst material formed by compaction are then granulated by various techniques. The granulated material is typically size-separated. The desired catalyst granules can then be conveyed immediately to a shaping operation, or to a storage facility. The shape of the catalyst is not critical for this invention. It will of course depend on the manner in which the catalyst is being used for subsequent alkylation operations. Very often, the catalyst is compressed into a pellet or "tablet". Conventional pelletizing equipment can accomplish this task (e.g., a Betapress), as described in U.S. Pat. No. 4,900,708, incorporated herein by reference. Pellets prepared according to this invention usually have a bulk density of about 0.75 g/cc to about 1.0 g/cc, and have good handling strength.

The shaped catalyst composition is then calcined, as described in U.S. Pat. No. 4,554,267. Calcination is usually carried out by heating the catalyst at a temperature sufficient to convert the magnesium reagent to magnesium oxide, which is the active species in the catalyst. (Calcination increases the surface area of the catalyst). The calcination temperature may vary somewhat, but is usually in the range of about 350° C. to about 550° C. The calcination atmosphere may be oxidizing, inert, or reducing. (Alternatively, the catalyst can be calcined at the beginning of the alkylation reaction. In other words, calcination can take place in the presence of the alkylation feed materials, i.e., the hydroxy aromatic compound and the alkyl alcohol.) The surface area of the catalyst after calcination is usually in the range of about 100 $m^2/g$ to about 250 $m^2/g$, based on grams of magnesium oxide.

It should be apparent that another embodiment of this invention is directed to a process for selectively alkylating one or more hydroxyaromatic compounds, such as phenol. The key feature of this process is the use of the magnesium-based catalyst described above, i.e., one having reduced levels of chlorides and calcium. Hydroxyaromatic compounds which can be alkylated according to this invention most often have a free ortho-position. Many of them are described in the above-referenced U.S. Pat. Nos. 4,554,267; 4,201,880; and 3,446,856, all of which are incorporated herein by reference. The most preferred hydroxyaromatic compounds are the monohydroxyaromatic compounds—especially those in which the para-position is unsubstituted. Phenol and o-cresol are preferred compounds of this type. (o-Cresol is often a by-product in the methylation of phenol to 2,6-xylenol). Phenol is especially preferred. Mixtures of any of these compounds may also be used.

The alcohol used for alkylation may be primary or secondary, and is often primary. Non-limiting examples of suitable alcohols are described in U.S. Pat. No. 4,554,267, and include methanol, ethanol, 1-propanol, 2-propanol, 1-butanol, 2-methyl-1-propanol, 1-hexanol, and mixtures of any of the foregoing. (Alcohols containing up to 4 carbon atoms are often preferred). Methanol is often the most preferred alcohol.

The alkylation techniques are generally known in the art, and described in the above-referenced U.S. Pat. Nos. 4,554, 267 and 3,446,856. Suitable processes are also described in U.S. Pat. Nos. 4,933,509; 4,900,708; 4,554,266; 4,547,480; 4,048,239; 4,041,085; and 3,974,229, all of which are incorporated herein by reference.

A variety of alkylated compounds may be formed by this method, such as 2,6-xylenol or 2,3,6-trimethyl phenol. In many embodiments, 2,6-xylenol is the preferred product. Usually, this material is produced by a gas phase reaction between phenol and methanol, utilizing the catalyst of this invention. Those skilled in the polymer- and chemical engineering arts are familiar with the details regarding this type of reaction. As the examples describe, use of the alkylated catalyst discovered by the present inventors results in very good product formation rates, as well as excellent selectivity toward the desired alkylated product. Those familiar with chemistry and chemical reactions would be able to select the proper starting materials for each of the desired alkylated compounds. For example, 2,3,6-trimethyl phenol can be prepared by reacting m-cresol with methanol, using the alkylation catalyst described herein.

Another embodiment of this invention is directed to a method for preparing polyphenylene ether resin, using an alkyl-disubstituted phenolic compound prepared with the catalyst composition described above. Polyphenylene ether (sometimes referred to as "PPE" or "polyphenylene oxide") is a well-known resin product. It is usually made by polymerizing a selectively-alkylated hydroxyaromatic compound, e.g., a 2,6-alkyl-disubstituted phenolic compound such as 2,6-xylenol. The most common technique is the oxidative coupling of the substituted phenolic compound in the presence of a suitable polymerization catalyst. Methods for preparing polyphenylene ethers are described, for example, in U.S. Pat. Nos. 5,017,655; 4,092,294; 4,083,828; 3,962,181; 3,306,875; and 3,306,874, all of which are incorporated herein by reference. Polyphenylene ether copolymers are also within the scope of this invention, e.g., those obtained by the polymerization of a mixture of 2,6-xylenol and 2,3,6-trimethyl phenol.

Various catalysts can be used for preparing the polyphenylene ethers, and this invention is not restricted to any particular polymerization catalyst. Examples of suitable catalyst systems include a mixture of manganese-, cobalt- or copper salts with an alkali metal alcoholate or phenolate; a mixture of a manganese salt, an alcohol, and a tertiary amine; or a mixture of various amines with a copper compound. Copper-amine complexes which include at least two amine compounds, as described in U.S. Pat. No. 4,092,294, are preferred for many embodiments of this invention.

Various details regarding the polymerization reaction are known in the art. For example, those skilled in this type of polymerization are familiar with factors regarding solvent selection; gas flow rates (e.g., for oxygen); reaction time, and reaction temperature; as well as techniques for precipitation and drying of the polymer. Polyphenylene ethers prepared according to this disclosure have all of the desirable attributes exhibited by polyphenylene ethers prepared by prior art processes.

The polyphenylene ethers can be blended with a variety of other materials which provide additional attributes. Examples of these blends are provided in U.S. Pat. Nos. 5,017,656; 4,874,810; and 4,822,836, all of which are incorporated herein by reference. For example, polyphenylene ether is frequently blended with various alkenyl aromatic polymers, such as polystyrene or rubber-modified (high impact) polystyrene. Polyphenylene ether may also be blended with various polyamide resins, to provide enhanced chemical resistance. (Polyphenylene ether/polyamide blending is carried out in the presence of a compatibilizing agent, as described in the referenced patents). Those skilled in the art are familiar with procedures for preparing these blended products.

EXAMPLES

The following examples are merely illustrative, and should not be construed to be any sort of limitation on the scope of the claimed invention.

In each of samples A–D, the level of chlorides in the magnesium reagent was less than about 100 ppm. The level of calcium in the reagent was less than about 1000 ppm.

Sample A was prepared according to a method outside the scope of the present invention. It involves the preparation of a magnesium carbonate-type catalyst in a "wet" process, using a copper promoter. 17 kg of basic magnesium carbonate was added, with stirring, to 25.5 gallons of deionized water which contained 17.0 grams of cupric nitrate trihydrate. The resulting slurry was mixed for one hour. The material was dried at 120° C. for 24 hours. The dried solids were then blended with 85 grams of graphite (0.5% by weight) and 340 grams (2.0% by weight) of polyphenylene ether. The blend was compacted, granulated and pelletized into cylindrical pellets, 3/16 in. diameter and 1/8 inch long. The tablets were calcined in an alkylation reactor by heating at 380° C. for 22 hours, to yield the desired catalyst composition which contained 0.025% copper by weight, based on magnesium oxide.

Sample B was also prepared according to a method outside the scope of the present invention. It involves the preparation of a magnesium carbonate-type catalyst in a "wet" process, without using a copper promoter. 17 kg of basic magnesium carbonate was added, with stirring, to 25.5 gallons of de-ionized water. The resulting slurry was mixed for one hour. The material was dried at 120° C. for 24 hours. The dried solids were then blended with 85 grams of graphite (0.5% by weight) and 340 grams (2.0% by weight) of polyphenylene ether. The blend was compacted, granulated and pelletized into cylindrical pellets, 3/16 in. diameter and 1/8 inch long. The tablets were calcined in an alkylation reactor by heating at 380° C. for 22 hours, to yield magnesium oxide.

Sample C was also prepared according to a method outside the scope of the present invention. It involves the preparation of a magnesium carbonate-type catalyst in a dry-blending process, using a copper promoter. 17 kg of basic magnesium carbonate was blended with 17.0 grams of cupric nitrate trihydrate, 85 grams of graphite and 340 grams of polyphenylene ether. The blend was compacted, granulated and pelletized into cylindrical pellets, 3/16 in. diameter and 1/8 inch long. The tablets were calcined in an alkylation reactor by heating at 380° C. for 22 hours, to yield the desired catalyst composition. The composition contained 0.025% copper by weight, based on magnesium oxide.

Sample D was prepared according to the present invention. In other words, the catalyst was prepared in a dry process, without the use of a copper promoter. 17 kg of basic magnesium carbonate was blended with 85 grams of graphite and 340 grams of polyphenylene ether. The blend was compacted, granulated and pelletized into cylindrical pellets, 3/16 in. diameter and 1/8 inch long. The tablets were calcined in an alkylation reactor by heating at 380° C. for 22 hours, to yield magnesium oxide.

Sample E was prepared according to a prior art process, outside the scope of the present invention. In other words, the catalyst was prepared in a wet process substantially identical to that used for sample A, using a copper promoter. The basic magnesium carbonate used for this sample contained chloride levels in the range of about 100–200 ppm, and calcium levels greater than about 5000 ppm.

Experimental Procedure

A reactor was loaded with 100 cc of catalyst. The catalyst was calcined in situ for 22 hours at 380° C. in nitrogen, at atmospheric pressure. After calcination, the temperature was increased to 450° C. in two hours in a nitrogen atmosphere. After 15 minutes, a feed mixture was introduced at 4 cc/min, and reactor pressure was controlled to 25 psig. The feed contained 46.13 wt % methanol, 33.83 wt % phenol, and 20 wt % water (4:1 molar ratio of methanol to phenol). The alkylation was run for 165 hours at fixed conditions, during which the yields of o-cresol, 2,6-xylenol, p-cresol, 2,4-xylenol and mesitol were monitored. Conversion was measured at 165 hours, and is defined as the normalized wt % 2,6-xylenol in the effluent.

Conversion (%)=
(Weight of 2,6-xylenol in effluent)×100/(Weights of effluent phenolics)

After 165 hours, the conditions were adjusted to achieve 65 wt % 2,6-xylenol in the effluent. At 165 hr, selectivity was calculated as:

Selectivity=
(Effluent moles (p-cresol+2,4-xylenol+mesitol))/(Effluent moles (phenol+o-cresol+2,6-xylenol))

TABLE 1

| Sample | A* | B* | C* | D** | E*** |
| --- | --- | --- | --- | --- | --- |
| Carbonate No.[a] | 1 | 1 | 1 | 1 | 2 |
| Process | Wet | Wet | Dry | Dry | Wet |
| Copper | Yes | No | Yes | No | Yes |
| Conversion % | 72.0 | 71.8 | 69.1 | 72.2 | 45.4 |
| Selectivity | 0.040 | 0.036 | 0.041 | 0.037 | 0.050 |

[a]Carbonate #1 contains reduced levels of chlorides and calcium, as described previously; carbonate #2 contains higher levels of chlorides and calcium.
*Comparative samples
**Present invention
***Prior art sample The data set forth above demonstrate that the use of the magnesium reagent having reduced levels of chlorides and calcium results in much greater activity (as measured by conversion %), as compared to prior art sample E. Moreover, the selectivity was also greatly improved, as compared to sample E.

Polyphenylene ether resins were subsequently prepared from 2,6-xylenol products similar to that of sample D. These resins exhibited the same desirable attributes as those made in the prior art.

Having described preferred embodiments of the present invention, alternative embodiments may become apparent to those skilled in the art without departing from the spirit of this invention. Accordingly, it is understood that the scope of this invention is to be limited only by the appended claims.

All of the patents, articles, and texts mentioned above are incorporated herein by reference.

What is claimed is:

1. A method for preparing a solid catalyst composition, comprising the step of dry-blending at least one filler with a magnesium reagent which yields magnesium oxide upon calcination, thereby forming a blended product, wherein the level of chlorides in the magnesium reagent is less than about 250 ppm, and the level of calcium in the magnesium reagent is less than about 2500 ppm.

2. The method of claim 1, wherein the magnesium reagent is selected from the group consisting of magnesium oxide, magnesium hydroxide, magnesium carbonate, basic magnesium carbonate, and mixtures of any of the foregoing.

3. The method of claim 1, wherein the level of chlorides in the magnesium reagent is less than about 125 ppm, and the level of calcium in the magnesium reagent is less than about 1000 ppm.

4. The method of claim 1, wherein the magnesium reagent is in the form of a powder, and the average particle size for the powder is in the range of about 5 microns to about 50 microns.

5. The method of claim 1, wherein the filler is present in an amount up to about 20% by weight, based on the total weight of filler and magnesium reagent.

6. The method of claim 5, wherein the filler is present in an amount up to about 10% by weight, based on the total weight of filler and magnesium reagent.

7. The method of claim 1, wherein the filler is selected from the group consisting of polyphenylene ether, graphite, and mixtures thereof.

8. The method of claim 1, wherein the dry-blending is carried out in the absence of a promoter.

9. The method of claim 1, wherein the dry-blending is carried out in the absence of a copper promoter.

10. The method of claim 1, wherein the solid catalyst composition is vacuum-deaerated after dry-blending.

11. The method of claim 1, wherein the solid catalyst composition is compacted after dry-blending.

12. The method of claim 11, wherein the solid catalyst composition is vacuum-deaerated prior to being compacted.

13. The method of claim 11, wherein the solid catalyst composition is granulated after being compacted.

14. The method of claim 13, wherein the granulated catalyst composition is shaped into a desired physical form.

15. The method of claim 14, wherein the shaped catalyst composition has a bulk density in the range of about 0.75 g/cc to about 1.0 g/cc.

16. The method of claim 14, wherein the shaped catalyst composition is calcined.

17. The method of claim 1, wherein the blended product is calcined.

* * * * *

(12) EX PARTE REEXAMINATION CERTIFICATE (4887th)
United States Patent
Watson et al.

(10) Number: US 6,261,987 C1
(45) Certificate Issued: Dec. 30, 2003

(54) METHOD FOR PREPARING AN ALKYLATION CATALYST, AND FOR ORTHO-ALKYLATING HYDROXYAROMATIC COMPOUNDS; AND RELATED COMPOUNDS

(75) Inventors: Beth A. Watson, East Greenbush, NY (US); Narsi Devanathan, Slingerlands, NY (US)

(73) Assignee: General Electric Company, Schenectady, NY (US)

Reexamination Request:
No. 90/006,426, Oct. 30, 2002

Reexamination Certificate for:
Patent No.: 6,261,987
Issued: Jul. 17, 2001
Appl. No.: 09/515,466
Filed: Feb. 29, 2000

(51) Int. Cl.[7] ............... B01J 21/10; B01J 23/02
(52) U.S. Cl. ............ 502/183; 502/226; 502/340; 528/110; 528/445; 528/489; 528/495
(58) Field of Search ................ 502/183, 226, 502/340; 528/110, 445, 489

(56) References Cited

U.S. PATENT DOCUMENTS 5,847,237 A 12/1998 Yago et al.

FOREIGN PATENT DOCUMENTS

WO    WO 84/01146    3/1983

OTHER PUBLICATIONS

PCT International Search Report, International Application No. PCT/US 01/00090, International Filing Date Mar. 1, 2001 (3 pages).

*Primary Examiner*—Elizabeth Wood

(57) ABSTRACT

A method for preparing a solid catalyst composition is described. A magnesium reagent which yields magnesium oxide upon calcination, and which includes reduced levels of chlorides and calcium, is dry-blended with at least one filler. Dry-blending is usually carried out in the absence of a promoter. A method for selectively alkylating at least one hydroxyaromatic compound by using the catalyst is also described. A typical product is 2,6-xylenol. Related processes for preparing polyphenylene ethers are described.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *